United States Patent
Schluse

(10) Patent No.: US 12,091,088 B2
(45) Date of Patent: Sep. 17, 2024

(54) VEHICLE ROOF COMPRISING A ROOF ELEMENT AND METHOD FOR PRODUCING A VEHICLE ROOF ELEMENT

(71) Applicant: Webasto SE, Stockdorf (DE)

(72) Inventor: Kevin Schluse, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 175 days.

(21) Appl. No.: 17/761,733

(22) PCT Filed: Aug. 13, 2020

(86) PCT No.: PCT/EP2020/072775
§ 371 (c)(1),
(2) Date: Mar. 18, 2022

(87) PCT Pub. No.: WO2021/073796
PCT Pub. Date: Apr. 22, 2021

(65) Prior Publication Data
US 2022/0340207 A1  Oct. 27, 2022

(30) Foreign Application Priority Data

Oct. 18, 2019  (DE) ...................... 10 2019 128 190.3

(51) Int. Cl.
*B62D 25/06* (2006.01)
*B62D 27/02* (2006.01)

(52) U.S. Cl.
CPC ........... *B62D 25/06* (2013.01); *B62D 27/026* (2013.01)

(58) Field of Classification Search
CPC ...... B62D 25/06; B62D 27/026; B62D 29/04; B62D 29/043

(Continued)

(56) References Cited

U.S. PATENT DOCUMENTS 9,475,434 B2 * 10/2016 Mankame ............... B60R 13/02
2005/0104418 A1    5/2005 Zirbs
(Continued)

FOREIGN PATENT DOCUMENTS

CN      1964861 A      5/2007
CN    104828148 A      8/2015
(Continued)

OTHER PUBLICATIONS

Office Action issued against corresponding Chinese Patent Application No. 202080072960.2 dated Jun. 29, 2023 English Translation (14 pages).

(Continued)

*Primary Examiner* — Pinel E Romain
(74) *Attorney, Agent, or Firm* — Fitch, Even, Tabin & Flannery, LLP

(57) ABSTRACT

A vehicle roof having a roof element having a planar panel made of glass, plastic or metal, the panel having an outer side facing a vehicle environment and an inner side facing a vehicle interior, and the roof element having a connecting metal plate connected to the inner side of the panel via a molded portion. The connecting metal plate is in loose and sealing contact with the inner side of the panel via contact flanges and defines a cavity together with the inner side of the panel, the cavity being filled by the molded portion, and the connecting metal plate is free from molded portions at its surfaces disposed outside the cavity.

11 Claims, 4 Drawing Sheets

Figure 1:
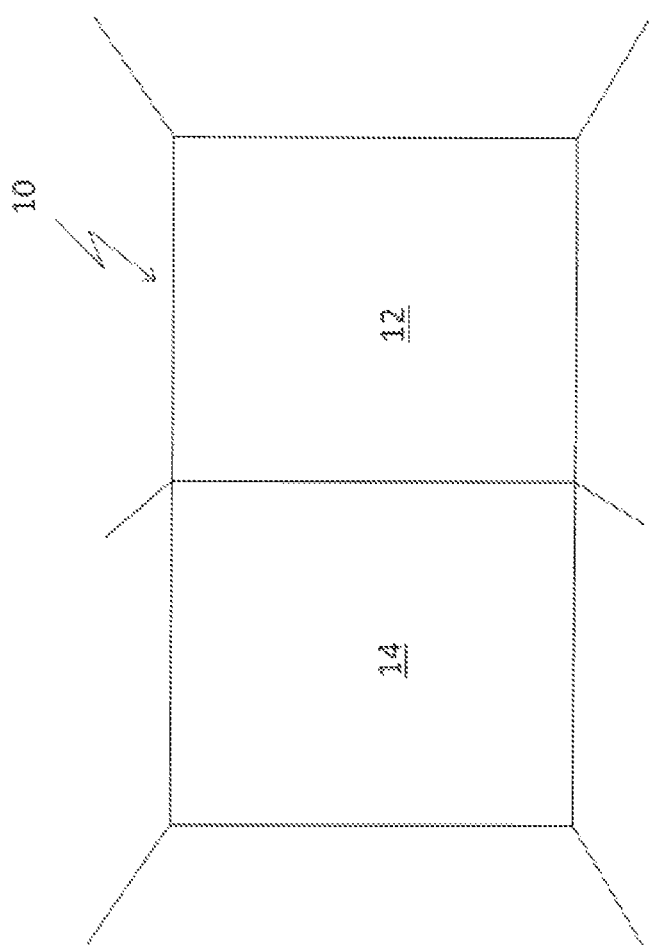

(58) Field of Classification Search
USPC .............................. 296/97.8, 215, 210, 191
See application file for complete search history.

(56) References Cited

U.S. PATENT DOCUMENTS

| | | | |
|---|---|---|---|
| 2008/0272625 A1 | 11/2008 | Paetz | |
| 2010/0276969 A1 | 11/2010 | Auchter-Bruening | |
| 2013/0187413 A1 | 7/2013 | Schroferl | |
| 2014/0097636 A1* | 4/2014 | Snider | B60J 3/02 296/97.8 |
| 2015/0217812 A1 | 8/2015 | Hinz | |
| 2015/0224856 A1* | 8/2015 | Snider | B60J 7/0015 296/97.8 |
| 2020/0298456 A1 | 9/2020 | Seebass | |

FOREIGN PATENT DOCUMENTS

| | | | | |
|---|---|---|---|---|
| CN | 109070409 A | | 12/2018 | |
| DE | 10115568 A1 | * | 10/2002 | .............. B60J 10/90 |
| DE | 10249405 A1 | | 5/2004 | |
| DE | 102011013818 A1 | | 9/2012 | |
| DE | 102014003969 A1 | | 9/2015 | |
| DE | 102017010622 A1 | | 5/2018 | |
| DE | 102018111783 A1 | * | 11/2019 | |
| DE | 102021114030 A1 | * | 12/2022 | ............ B60J 7/0007 |
| EP | 1283155 B1 | * | 8/2007 | ........... B62D 29/043 |
| WO | 2015139986 A1 | | 9/2015 | |

OTHER PUBLICATIONS

Written Opinion of the International Searching Authority for PCT/EP2020/072775 mailed Apr. 28, 2022, in English (8 pages).

International Search Report for PCT/EP2020/072775 mailed Dec. 8, 2020, in German and English (6 pages).

Office Action issued against corresponding Chinese Patent Application No. 202080072960.2 dated Jan. 15, 2024 English Machine Translation (15 pages). Cited references provided in previous IDS'es.

* cited by examiner

VEHICLE ROOF COMPRISING A ROOF ELEMENT AND METHOD FOR PRODUCING A VEHICLE ROOF ELEMENT

CROSS-REFERENCE TO RELATED APPLICATION

This application is a U.S. national phase application filed under 35 U.S.C. § 371 of International Application No. PCT/EP2020/072775, filed Aug. 13, 2020, designating the United States, which claims priority from German Patent Application Number 10 2019 128 190.3 filed on Oct. 18, 2019, which is hereby incorporated herein by reference in its entirety for all purposes.

FIELD

The invention relates to a vehicle roof having the features of the preamble of claim 1 and a method for producing a vehicle roof element.

BACKGROUND

A vehicle roof which comprises a fixed roof element as an outer roof skin element fixed relative to a vehicle structure or a vehicle body and having a planar panel made of glass, plastic or sheet metal is known from practice. A connecting metal plate is connected to the panel via a molded portion made of polyurethane foam.

The connecting metal plate allows the roof element to be attached to the vehicle body. So far, the connecting metal plate has been connected to the panel in a mold having a cavity for forming the molded portion. Such a mold is expensive, which is in turn reflected in the costs of the resulting vehicle roof.

Alternatively, it is known for a glass panel which is part of a fixed roof element to be provided with a polyurethane foam frame via which it is connected to a vehicle body shell. A mold having a cavity whose walls are provided with a release agent is used for producing the frame. However, gluing the polyurethane foam frame to the vehicle body shell requires for the frame to be freed from release agent residue after its production and thus be mechanically prepared for the gluing process, which can prove laborious. Yet the release agent in the mold is necessary in order to be able to demold the molded portion produced in the mold.

SUMMARY

The object of the invention is to provide a vehicle roof with a roof element which can be produced at low cost and which can be connected to a vehicle structure without further pretreatment, and a method for producing such a vehicle roof element.

According to the invention, this object is attained by the vehicle roof having the features of claim 1 and the method having the features of claim 10.

So the invention proposes a vehicle roof comprising a roof element having a planar panel made of glass, plastic or sheet metal and a connecting metal plate connected to the inner side of the panel via a molded portion. The connecting metal plate is in loose and sealing contact with the inner side of the panel via contact flanges and defines a cavity together with the inner side of the panel, the cavity being filled by the molded portion, which holds the connecting metal plate on the panel. The connecting metal plate is free from molded portions at its surfaces disposed outside the cavity; i.e., the material fixing the connecting metal plate to the panel is contained in the cavity only.

Therefore, producing the molded portion of the vehicle roof according to the invention does not require a complex mold forming a cavity for the molded portion. Instead, the cavity in which the molded portion is formed is defined by the roof element itself, i.e., by the planar panel and by the connecting metal plate. Roof elements of this kind can be produced with short cycle times. Since the connecting metal plate can be connected directly to a vehicle structure, elaborate reworking of the panel provided with the connecting metal plate prior to installation is unnecessary. Release agents within a cavity are not required, either. When molding the molded portion, i.e., when connecting the connecting metal plate to the panel, the connecting metal plate merely needs to be pushed against the inner side of the panel, resulting in sealing surfaces between its contact flanges and the panel.

The term "molded portion" refers to a portion of the vehicle roof according to the invention which is produced according to a plastic molding method, in particular according to an injection molding process or a foaming process, in which a plastic material in castable shape is introduced into a mold cavity or a cavity and hardens there. This is the case in an RIM (reaction injection molding) process, for example. In the case at hand, the mold cavity or the cavity is defined or delimited by the panel on one side and by the connecting metal plate on the other side.

In a preferred embodiment of the vehicle roof according to the invention, the connecting metal plate and the cavity are of a frame-like design, wherein they circumferentially follow the edges of the panel. The connecting metal plate can thus be circumferentially connected to the panel by means of a single cavity.

In order to allow a simple production of the vehicle roof according to the invention, the connecting metal plate advantageously has two openings connecting the cavity to the environment. Gating, i.e., the introduction of the material from which the molded portion is formed, takes place via one of the openings. The ventilation during the introduction of the material takes place via the other opening. So air can be displaced from the cavity by the introduced material. Naturally, material remains or residues, which are produced during the molding of the molded portion owing to the nature of the mold, are also present on the outer side of the connecting metal plate at least in the area of one of the openings. However, remains or residues of this kind, which are dome-shaped or mushroom-shaped, for example, are not to be considered a molded portion disposed on a surface of the connecting metal plate located outside the cavity within the meaning of the invention.

In an advantageous embodiment of the vehicle roof according to the invention, sealing elements which are in loose and sealing contact with the inner side of the panel are disposed between the contact flanges and the panel so as to ensure that no material escapes from the cavity during the production of the molded portion. There is no material bond between the sealing elements and the panel, only a form fit.

In a specific embodiment of the vehicle roof according to the invention, the roof element is a fixed roof element which is connected to the vehicle structure in a rigid, i.e., non-displaceable, manner.

In order to be able to connect the fixed roof element to the vehicle structure, it has a circumferential adhesion surface for connecting it to a vehicle structure in a specific embodiment. In this case, the connecting metal plate can be an outer ring of the planar panel, the outer ring having a homogenous adhesive surface. The connecting metal plate can additionally increase the stiffness of the planar panel.

The adhesion surface can form an in particular stepless frame surface which encloses the planar panel and which is thus disposed on the outer side with respect to the center of the planar panel.

In a specific embodiment of the vehicle roof according to the invention, the adhesion surface is formed on a bent portion of the connecting metal plate, the bent portion being an outer bent portion with respect to a center of the fixed roof element, in order to provide an installation-friendly support and adhesion surface on the connecting metal plate.

In an advantageous embodiment, the vehicle roof according to the invention has a substructure which is attached to the vehicle or the body and to the top of which the fixed roof element is attached via a bead of glue disposed on the adhesion surface. The roof substructure can be formed by a roof frame or the like and is disposed rigidly relative to the vehicle structure or the vehicle body.

The connecting metal plate can be a single element, i.e., produced as a one-piece die-cut and bent metal part, which is accompanied by short cycle times. Alternatively, it is of course also conceivable for the connecting metal plate to be composed of multiple leg elements, which are connected to each other via welds, for example, and form a frame-like element in the jointed state.

The connecting metal plate can additionally have a multifunction and serve to support a functional element in addition to serving for the connection to the vehicle structure. In this case, the connecting metal plate can have a fixing portion for attaching the functional element, which can in particular be an element of a shading assembly.

The invention also relates to a method for producing a vehicle roof element having a planar panel made of glass, plastic or sheet metal and a connecting metal plate for connecting the roof element to a vehicle structure, the method comprising the following steps:
 providing the panel;
 attaching the connecting metal plate to an inner side of the panel so that a cavity forms between the connecting metal plate and the panel and the connecting metal plate is in loose and sealing contact with the inner side of the panel via contact flanges;
 introducing a mold material into the cavity via a gate of the connecting metal plate so that a molded portion forms in the cavity, the molded portion alone fixing the connecting metal plate to the panel.

The method according to the invention can in particular take place in a device which has a holding tool holding the connecting metal plate in position on the inner side of the panel during the molding of the molded portion and which is preferably additionally provided with a holding means for the panel. For example, the device comprises a lower tool holding the panel in position and an upper tool forming the holding tool for the connecting metal plate.

Additionally, the device preferably has a gating means by means of which the material can be introduced into the cavity via the gate for connecting the connecting metal plate to the panel.

In a specific embodiment of the method according to the invention, the mold material is introduced into the cavity according to an RIM (reaction in mold) process, i.e., according to a method in which the material is introduced into the cavity under high pressure, where it chemically reacts and hardens.

During the molding or the introduction of the material into the cavity, the cavity can be ventilated via a ventilation opening, which can also be formed on the connecting metal plate.

The contact flanges of the connecting metal plate can be provided with sealing elements, via which they are brought into contact with the panel, so as to ensure that no mold material escapes from the cavity.

The mold material from which the molded portion is formed is in particular a polyurethane material which forms a polyurethane foam after a foaming process in the cavity defined by the connecting metal plate and the panel.

Other advantages and advantageous configurations of the object of the invention are apparent from the description, the drawing and the claims.

An exemplary embodiment of a vehicle roof according to the invention is schematically illustrated in the drawing and will be explained in more detail in the following description.

BRIEF DESCRIPTIONS OF THE DRAWINGS

Figure 2:
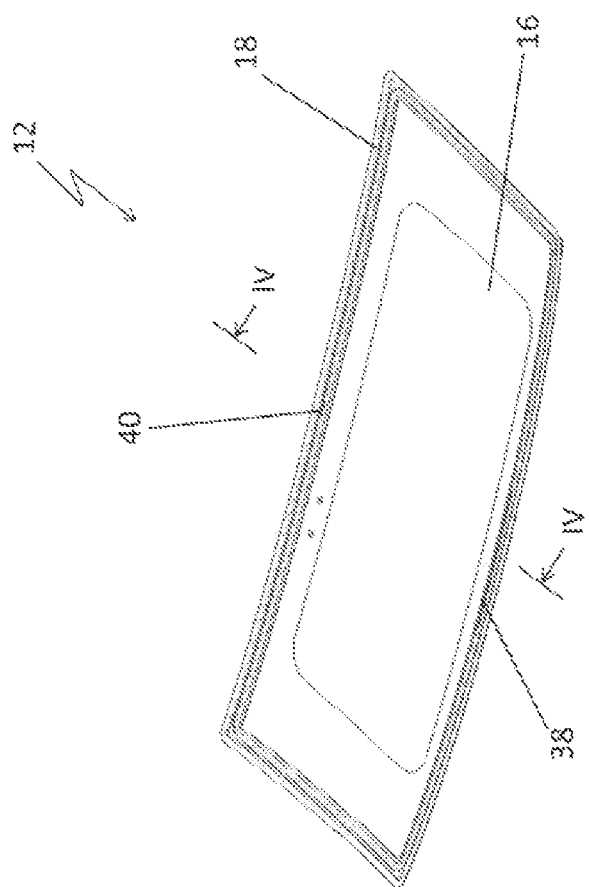
Figure 3:
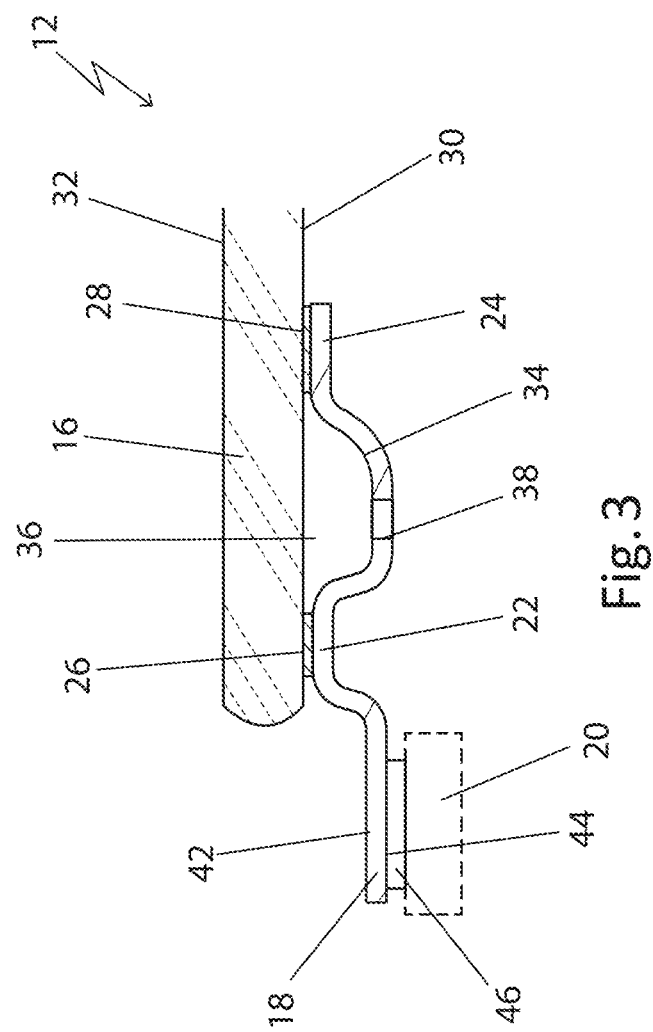
Figure 4:
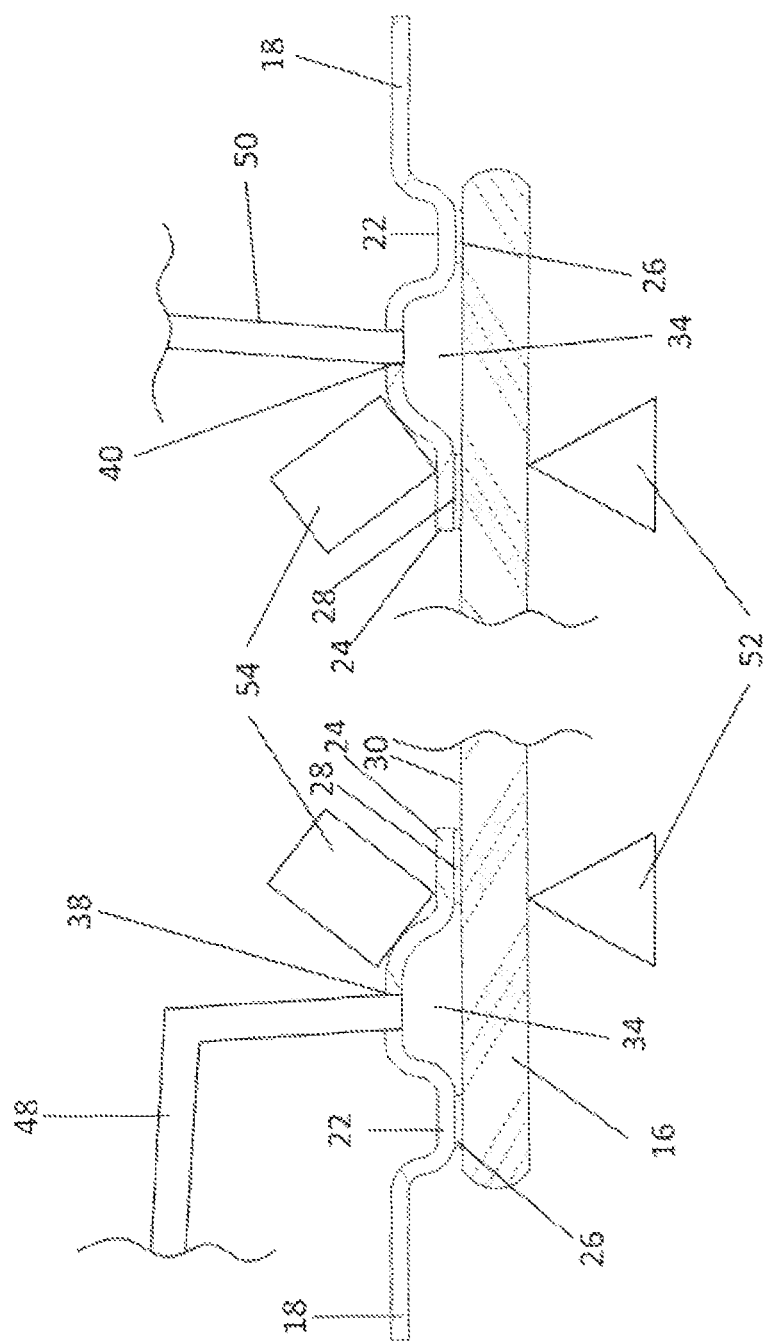

FIG. 1 is a schematic top view of a vehicle roof having a fixed roof element;
FIG. 2 is a bottom view of the fixed roof element;
FIG. 3 is a sectional view of the fixed roof element in the edge area; and
FIG. 4 is a sectional view of the fixed roof element along line IV-IV in FIG. 2 during its production.

DETAILED DESCRIPTION

FIG. 1 shows a roof 10 of a passenger car (not shown) which is configured as a panoramic roof and which has a fixed roof element 12 extending from the rear edge of roof 10 to a middle portion of roof 10. A roof opening which can be closed by means of a displaceable cover element 14 is formed forward of fixed roof element 12. By means of displacement kinematics (not shown), cover element 14 can be displaced between the closed position illustrated in FIG. 1 and an open position, in which the roof opening is at least partially open and cover element 14 is moved on top of fixed roof element 12. Fixed roof element 12, which is illustrated on its own in FIGS. 2 and 3, comprises a glass panel 16, which forms an outer roof skin element and is curved. At its circumferential edge, glass panel 16 is provided with a circumferential frame-like connecting metal plate 18, which serves to fix fixed roof element 12 to a roof substructure 20 attached to the vehicle and which is a die-cut/bent part made of steel or light metal.

Connecting metal plate 18 comprises two contact flanges 22 and 24 which extend in the manner of a frame and which are each provided with a sealing element 26 and 28, respectively, which is in loose contact with an inner side 30 of glass panel 16. The inner side 30 of glass panel 16 faces a vehicle interior. On outer side 32, which faces away from inner side 30, glass panel 16 forms the outer visible surface of fixed roof element 12.

Between the two sealing elements 26 and 28 or the two contact flanges 22 and 24, connecting metal plate 18, together with inner side 30 of glass panel 16, defines a frame-like circumferential cavity 34, which follows the shape of circumferential frame-like connecting metal plate 18. Cavity 34 is filled by a molded portion 36, which is made of a polyurethane foam material and fixes connecting metal plate 18 to glass panel 16.

For molding molded portion 36, connecting metal plate 18 has a gate 38, which is slot-shaped, on one frame leg in the area between the two contact flanges 22 and 24 and a ventilation opening 40 on a second frame leg.

Furthermore, connecting metal plate 18 has a support flange 42 which is disposed on the outer side with respect to the center of glass panel 16 and on whose underside a circumferential adhesion surface 44 is formed. Via adhesion surface 44, fixed roof element 12 is glued to roof substructure 20 by means of a bead of glue 46.

Fixed roof element 12 is produced in the manner described below with reference to FIG. 4.

In a first method step, glass panel 16 is placed and secured in a holding device 52 with inner side 30 facing up. Subsequently, connecting metal plate 18 is loosely pushed against inner side 30 of glass panel 16 in a sealing manner via sealing elements 26 and 28, which are attached to contact flanges 22 and 24, by means of a holding tool 54.

Subsequently, a foaming device 48 is joined to gate 38 and a ventilation means 50 is joined to ventilation opening 40. Then, a polyurethane foam material is introduced into cavity 34, which is formed between connecting metal plate 18 and inner side 30 of glass panel 16, by means of foaming device 48, the air being simultaneously displaced from cavity 34 via ventilation opening 40 and ventilation means 50. The introduction of the polyurethane foam material, which forms molded portion 36 after hardening, takes place according to an RIM process under high pressures.

REFERENCE SIGNS 10 vehicle roof
12 fixed roof element
14 cover element
16 glass panel
18 connecting metal plate
20 roof substructure
22 contact flange
24 contact flange
26 sealing element
28 sealing element
30 inner side
32 outer side
34 cavity
36 molded portion
38 gate
40 ventilation opening
42 contact flange
44 adhesion surface
46 bead of glue
48 foaming device
50 ventilation means
52 holding device
54 holding tool

The invention claimed is:

1. A vehicle roof comprising:
a roof element having a planar panel made of at least one of glass, plastic and sheet metal,
the panel having an outer side facing a vehicle environment and an inner side facing a vehicle interior, and
the roof element having a connecting metal plate connected to the inner side of the panel via a molded portion,
wherein the connecting metal plate is in form fitting and sealing contact with the inner side of the panel via contact flanges and defines a cavity together with the inner side of the panel, the cavity being filled by the molded portion, and in that the connecting metal plate is free from molded portions,
wherein the connecting metal plate and the cavity each circumferentially follow an entire edge of the panel, and
wherein the connecting metal plate has two openings which connect the cavity to the vehicle environment.

2. The vehicle roof according to claim 1, wherein sealing elements are disposed between the contact flanges and the panel.

3. The vehicle roof according to claim 1, wherein the roof element is a fixed roof element.

4. The vehicle roof according to claim 3, wherein the connecting metal plate has a circumferential adhesion surface for connecting the fixed roof element to a vehicle structure.

5. The vehicle roof according to claim 4, wherein the adhesion surface is formed on an underside of a contact flange of the connecting metal plate, the contact flange being an outer contact flange with respect to a center of the fixed roof element.

6. The vehicle roof according to claim 4, further comprising a substructure which is attached to the vehicle or a body and to which the fixed roof element is attached via a bead of glue disposed on the adhesion surface.

7. A method for producing a vehicle roof element having a planar panel made of at least one of glass, plastic and sheet metal and a connecting metal plate for connecting the roof element to a vehicle structure, the method comprising the following steps:
providing the panel;
attaching the connecting metal plate to an inner side of the panel so that a cavity forms between the connecting metal plate and the panel and the connecting metal plate is in form fitting and sealing contact with the inner side of the panel via contact flanges; and
introducing a mold material into the cavity via a gate of the connecting metal plate so that a molded portion forms in the cavity, the molded portion alone fixing the connecting metal plate to the panel,
wherein the connecting metal plate and the cavity each circumferentially follow an entire edge of the panel, and
wherein the connecting metal plate has two openings which connect the cavity to the vehicle environment.

8. The method according to claim 7, wherein the connecting metal plate is pushed against the inner side of the panel by a holding tool during the molding of the molded portion.

9. The method according to claim 7, wherein the panel is held in position.

10. The method according to claim 7, wherein the mold material is introduced according to an RIM process.

11. The method according to claim 7, wherein the contact flanges are provided with sealing elements and are joined to the panel via the sealing elements.

* * * * *